United States Patent
Back et al.

(10) Patent No.: US 11,405,959 B2
(45) Date of Patent: Aug. 2, 2022

(54) METHOD AND APPARATUS FOR CONTROLLING MULTI-CHANNEL ACCESS

(71) Applicant: LG ELECTRONICS INC., Seoul (KR)

(72) Inventors: Seoyoung Back, Seoul (KR); Woosuk Ko, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 17/275,771

(22) PCT Filed: Sep. 20, 2018

(86) PCT No.: PCT/KR2018/011141
§ 371 (c)(1),
(2) Date: Mar. 12, 2021

(87) PCT Pub. No.: WO2020/059908
PCT Pub. Date: Mar. 26, 2020

(65) Prior Publication Data
US 2022/0061093 A1   Feb. 24, 2022

(51) Int. Cl.
*H04W 74/08*  (2009.01)
*H04W 4/40*  (2018.01)

(52) U.S. Cl.
CPC ......... *H04W 74/0816* (2013.01); *H04W 4/40* (2018.02); *H04W 74/0891* (2013.01)

(58) Field of Classification Search
CPC ... H04W 4/40; H04W 74/08; H04W 74/0816; H04W 74/0891
See application file for complete search history.

(56) References Cited

U.S. PATENT DOCUMENTS

| | | | |
|---|---|---|---|
| 7,843,819 | B1 | 11/2010 | Benveniste |
| 2007/0225044 | A1 | 9/2007 | Law et al. |
| 2017/0289733 | A1 | 10/2017 | Rajagopal et al. |
| 2018/0220410 | A1 | 8/2018 | Baghel et al. |
| 2018/0332660 | A1* | 11/2018 | Mueck ............. H04W 74/0816 |
| 2019/0364492 | A1* | 11/2019 | Azizi ................... H04W 68/005 |
| 2022/0014948 | A1* | 1/2022 | Smith .................... G06N 3/08 |

FOREIGN PATENT DOCUMENTS

WO   2017135580   8/2017

* cited by examiner

*Primary Examiner* — Kashif Siddiqui
(74) *Attorney, Agent, or Firm* — Dentons US LLP

(57) ABSTRACT

A multi-channel access control method of a V2X communication device is disclosed. The multi-channel access control method of a V2X communication device comprises the steps of: determining a multi-channel access interval for a service channel; and accessing a multi-channel on the basis of a synchronization interval and the multi-channel access interval.

14 Claims, 18 Drawing Sheets

[FIG. 1]
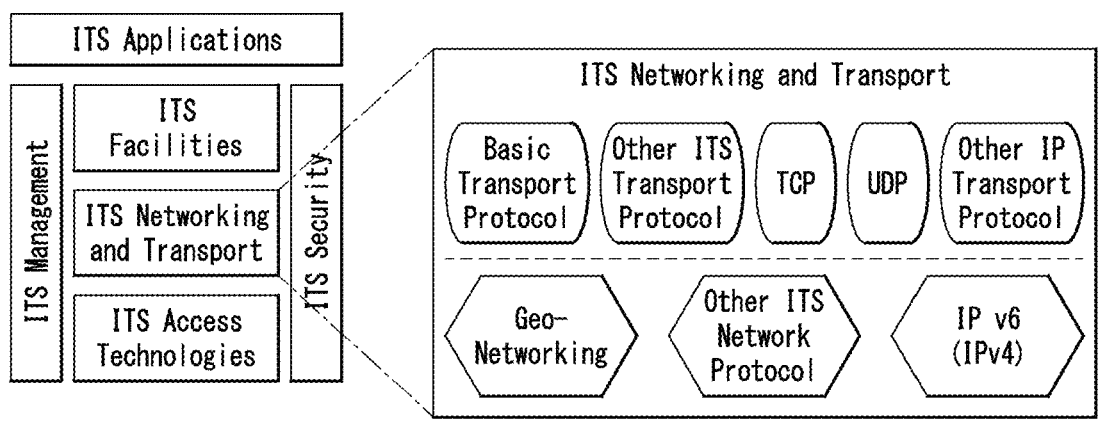

[FIG. 2A]
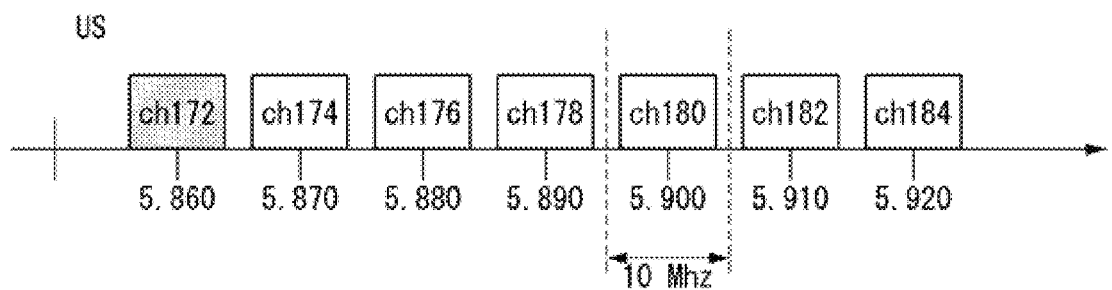
[FIG. 2B]
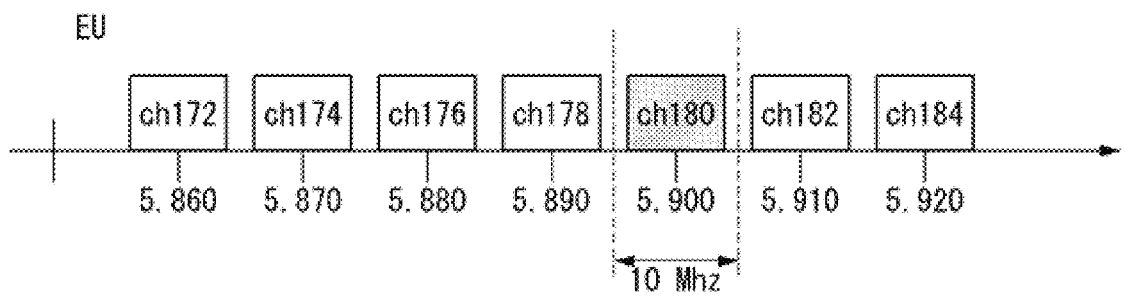

[FIG. 3]
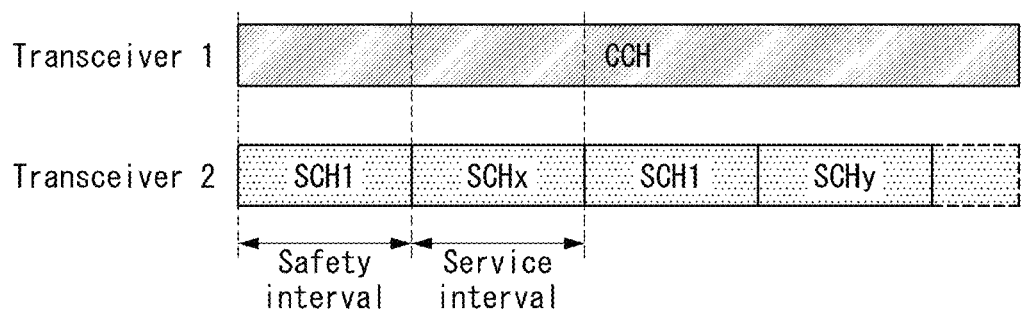

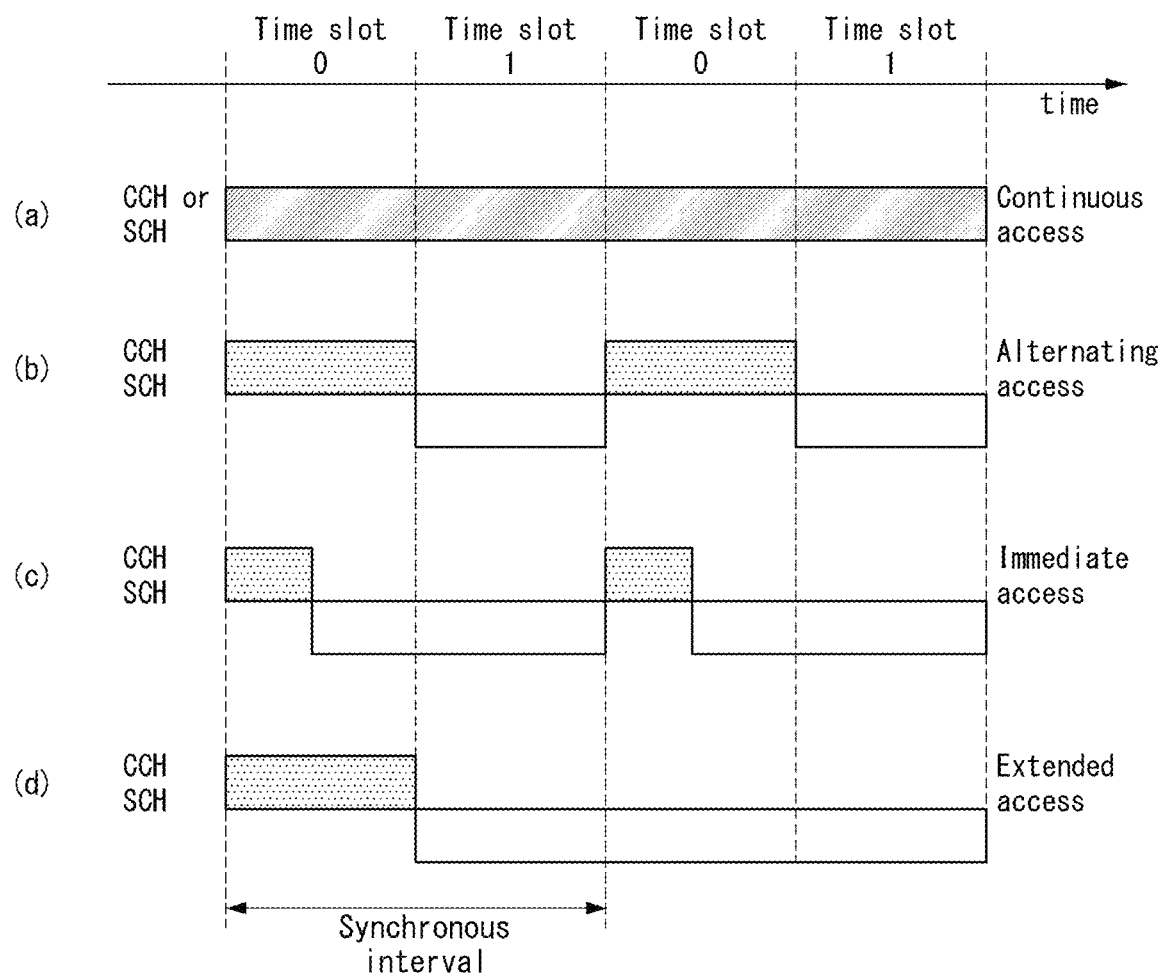
[FIG. 4]

[FIG. 5]
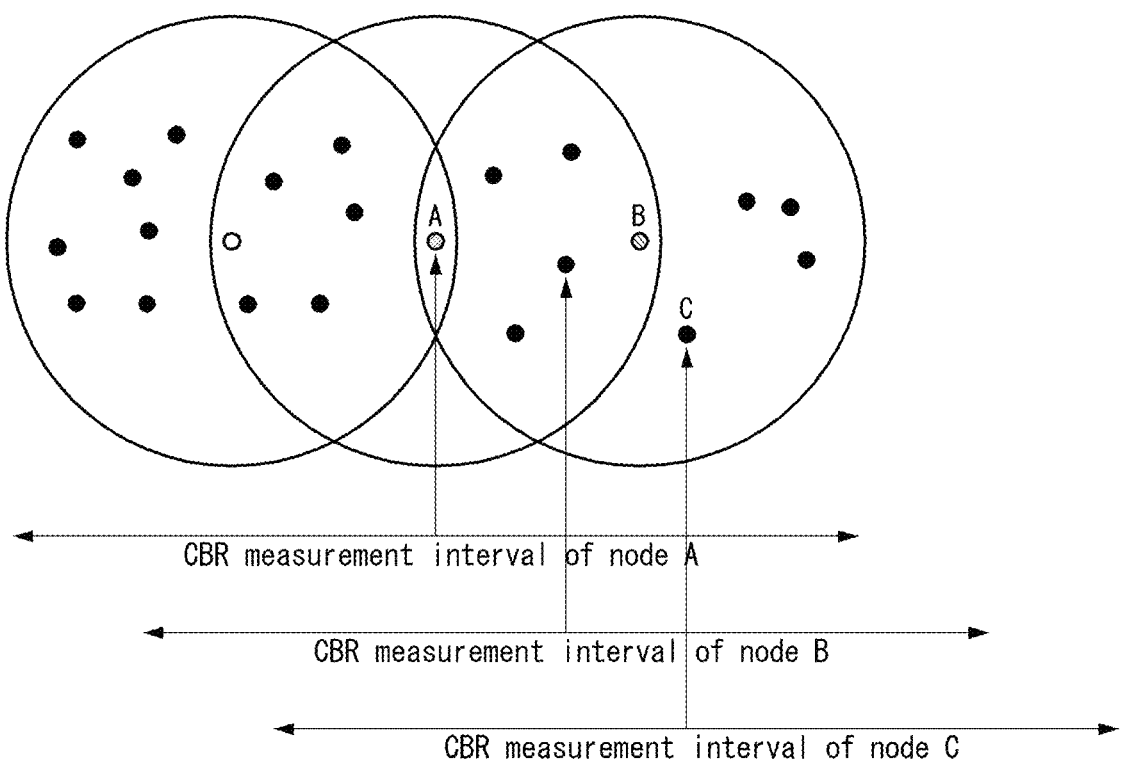

[FIG. 6]
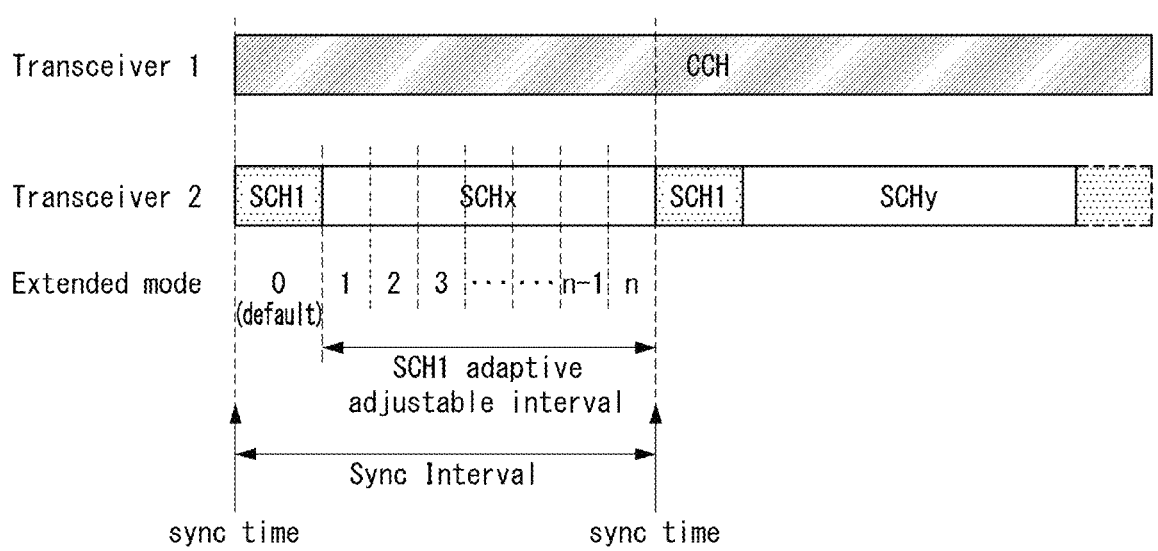

[FIG. 7]
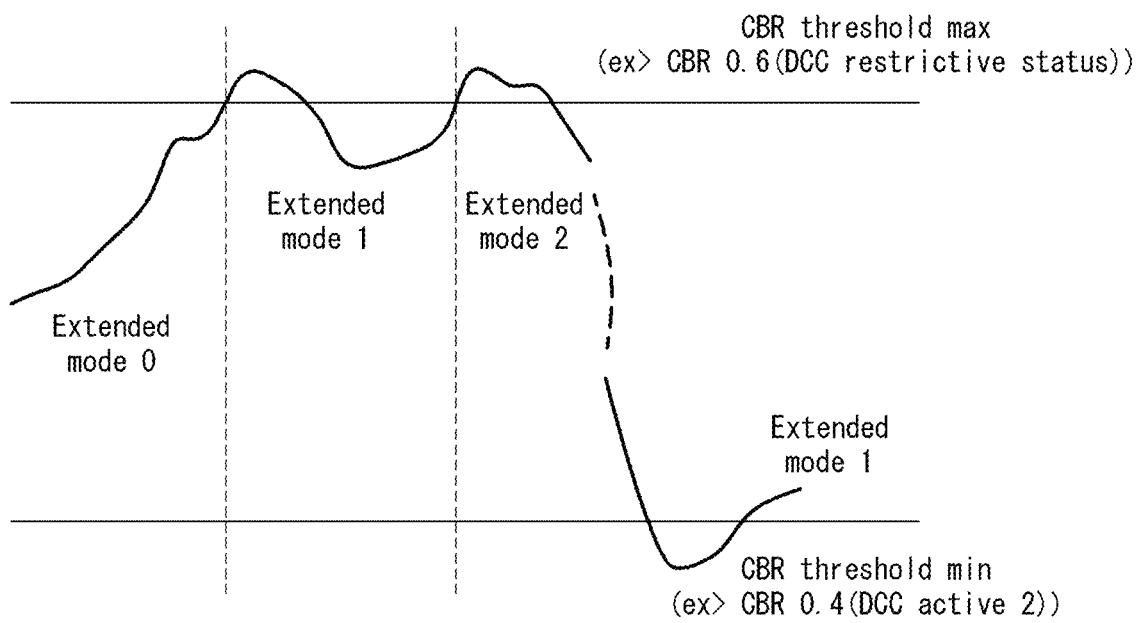

[FIG. 8]

<example 1>  Diff_up_threshold = 0.8
              Avg(Extended_i) = 2.4
              self_extended_mode = 2

Extended Mode 3 ─────────────────────────────

─ ─ ─ ─ ─ ─ ─ ─ ─ ─ ─ ─ ─ ─ ─ ─  Avg(Extended_i) = 2.4
                         ↕ Diff_mode
Extended Mode 2 ─────────────────────────────

[FIG. 9]
<example 2>  Diff_up_threshold = 0.8
              Avg(Extended_i) = 2.9
              self_extended_mode = 2
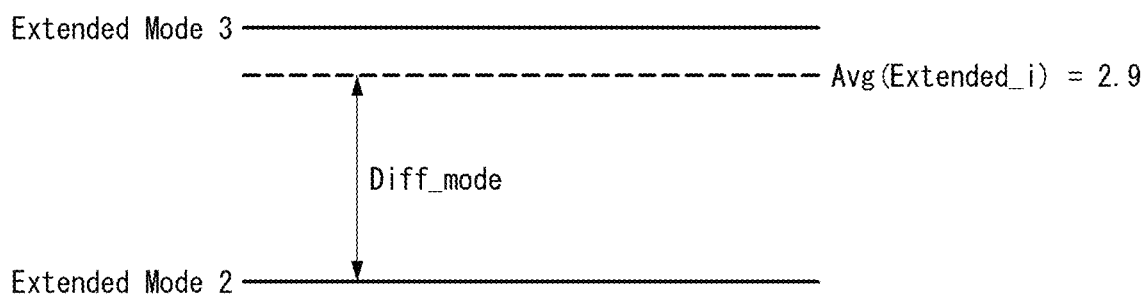

[FIG. 10]

<example 3>  Diff_up_threshold = 1.2
             Avg(Extended_i) = 2.9
             self_extended_mode = 2

Extended Mode 3 ——————————————————————————
                         — — — — — — — — — — — — — — — Avg(Extended_i) = 2.9

Extended Mode 2 ——————————————————————————

[FIG. 11]
<example 4>  Diff_up_threshold = -1.2
              Avg(Extended_i) = 2.4
              self_extended_mode = 3
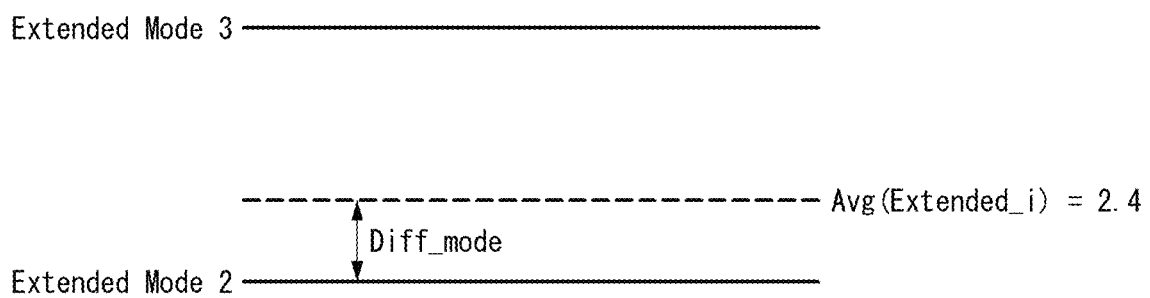

[FIG. 12]
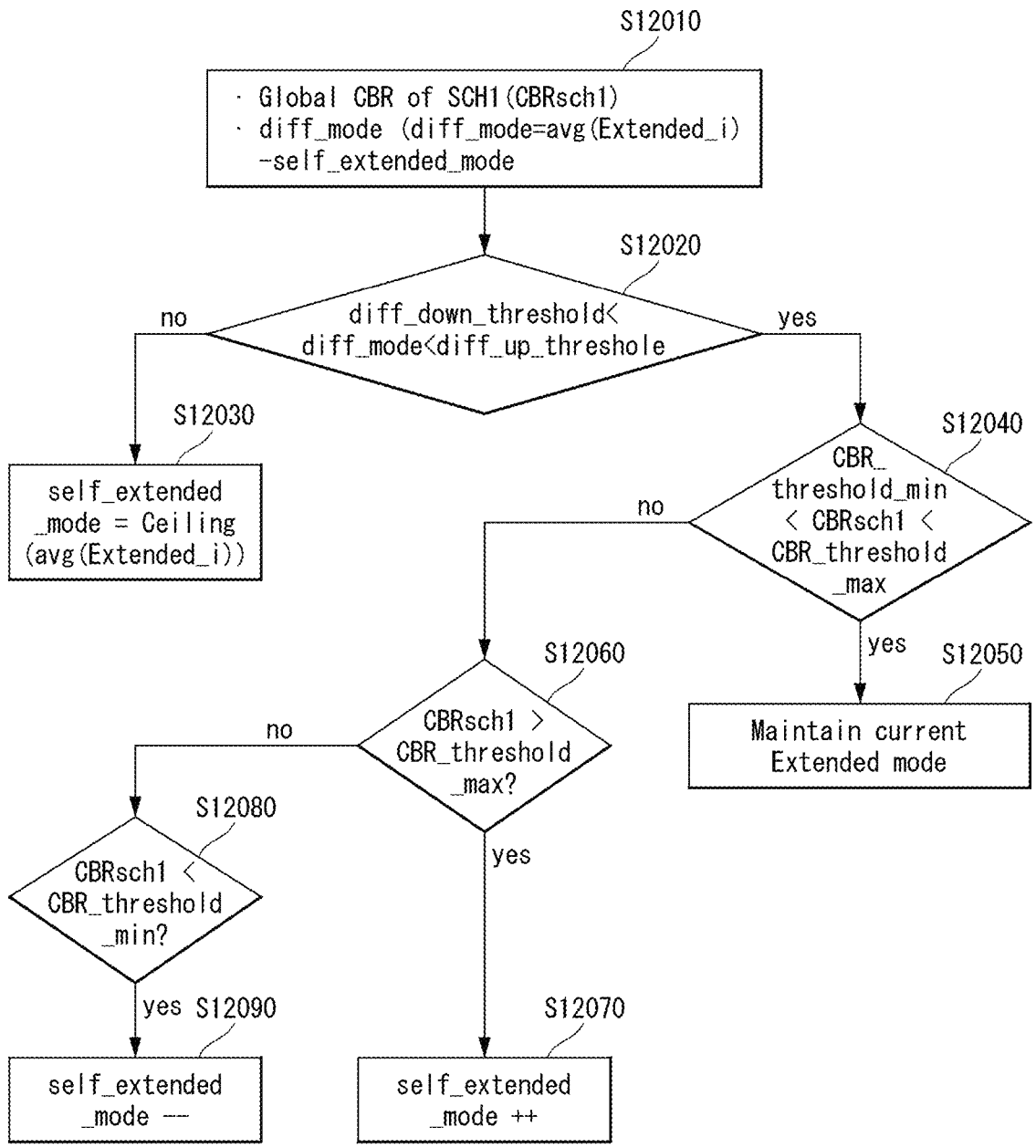

[FIG. 13]
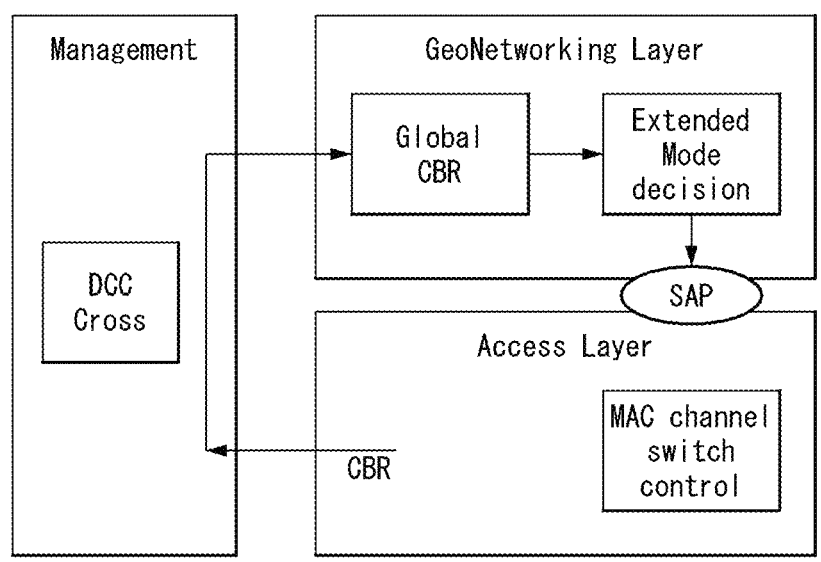

[FIG. 14]
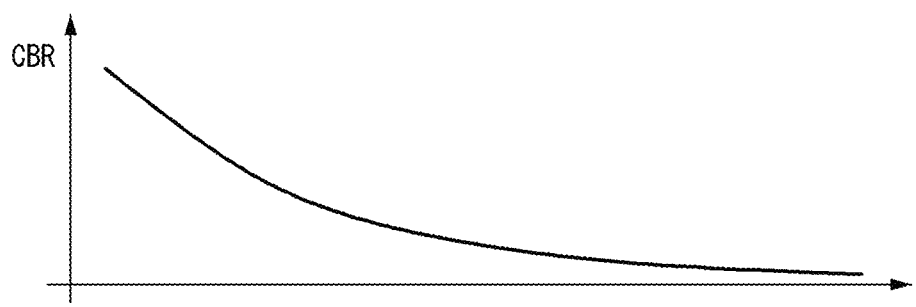
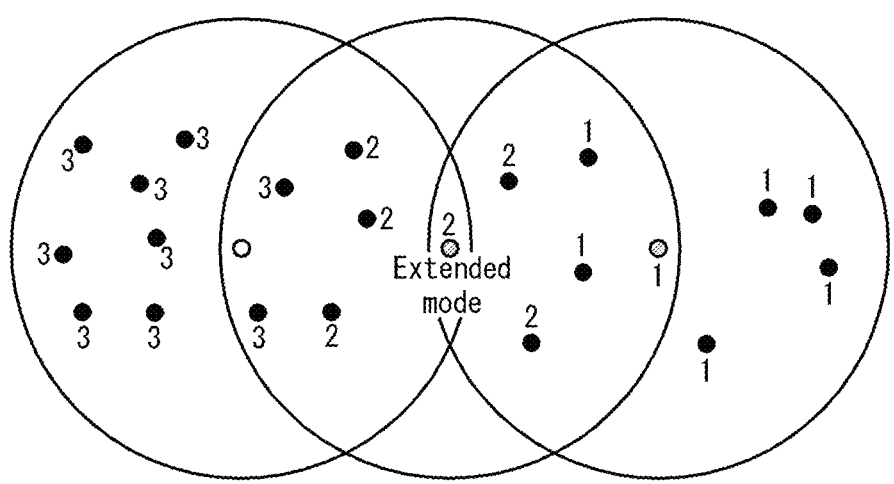

[FIG. 15A]
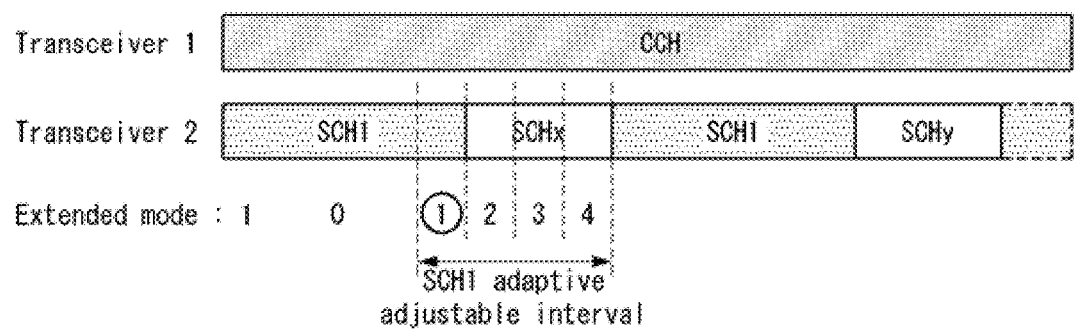
[FIG. 15B]
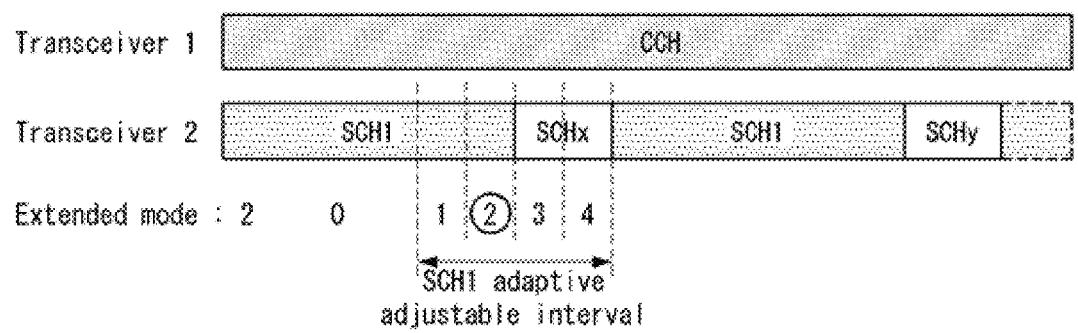

[FIG. 15C]
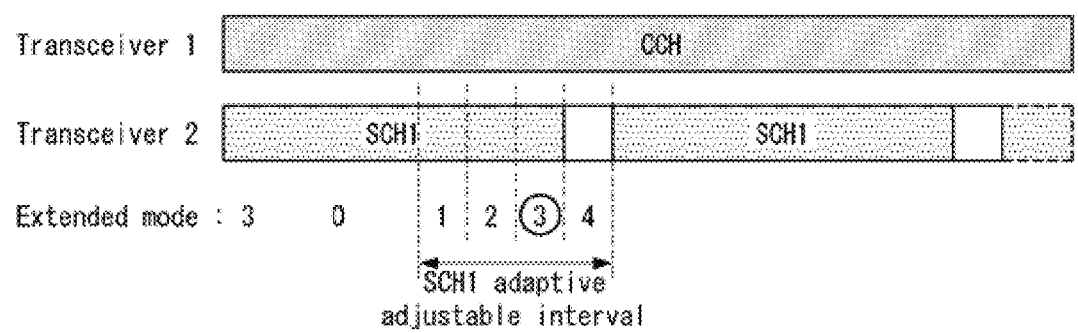
[FIG. 15D]
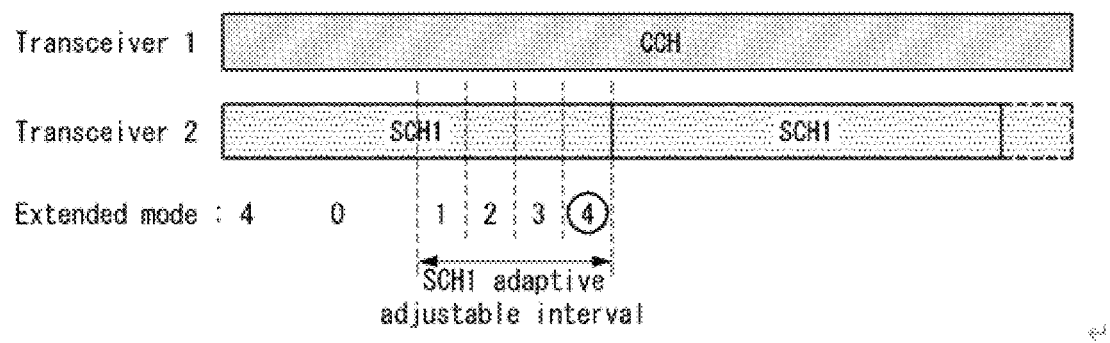

[FIG. 16]
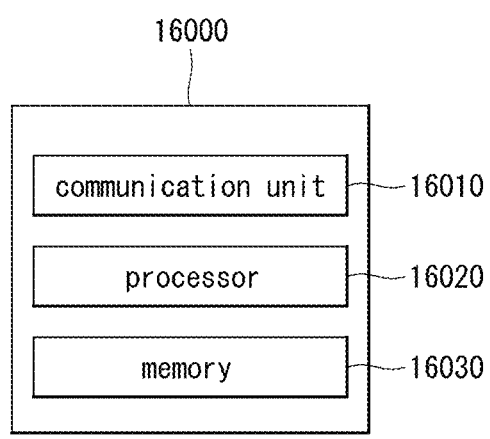

[FIG. 17]
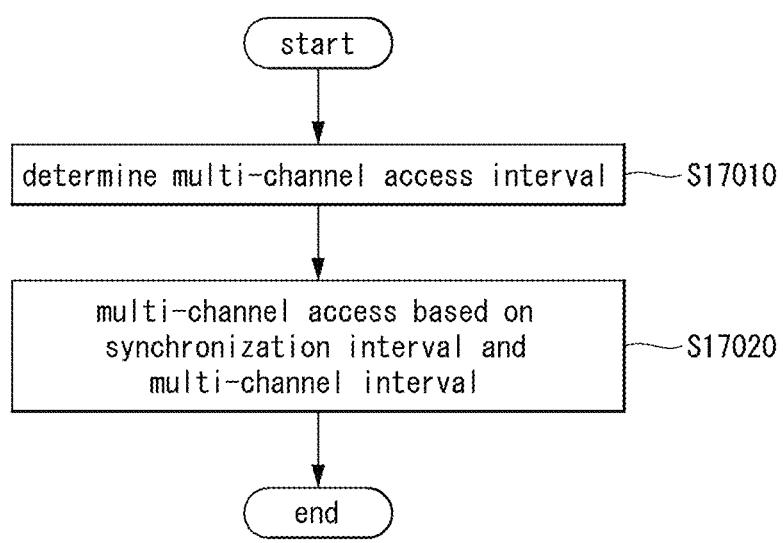

METHOD AND APPARATUS FOR CONTROLLING MULTI-CHANNEL ACCESS

This application is the National Stage filing under 35 U.S.C. 371 of international application no. PCT/KR2018/011141, filed on Sep. 20, 2018, the contents of which is hereby incorporated by reference herein in its entirety.

TECHNICAL FIELD

The disclosure relates to a multi-channel access control method of a V2X communication device, and in particular, to a multi-channel access control method for adaptively adjusting service channel access intervals in a synchronization channel.

BACKGROUND ART

Recently, vehicles are becoming a product of complex industrial technology, in which electrical, electronic and communication technologies are fused, centering on mechanical engineering. In this respect, vehicles are also called smart cars. Smart cars are providing various customized mobile services, as well as traditional vehicle technologies such as traffic safety/congestion settlement by connecting drivers, vehicles, and transportation infrastructures. This connectivity may be implemented using a Vehicle to Everything (V2X) communication technology.

DETAILED DESCRIPTION OF THE DISCLOSURE

Technical Problem

V2X communication may be performed using multiple channels. Since V2X communication performs ad hoc communication, the V2X communication device accesses the channel based on the synchronization interval. The V2X communication device may perform channel switching within the synchronization interval. When the channel switching interval is fixed, the channel use efficiency may be degraded.

Technical Solution

To address the foregoing technical problems, according to an embodiment of the disclosure, a method for controlling multi-channel access by a V2X communication device comprises determining a multi-channel access interval for a service channel, the multi-channel access interval determined based on an extended mode value and accessing multiple channels based on a synchronization interval and the multi-channel access interval. The synchronization interval includes a first access interval for a first service channel and a second access interval for a second service channel. The extended mode value indicates a variation in the first access interval adaptively adjusted within the synchronization interval.

In the multi-channel access control method according to an embodiment of the disclosure, the first access interval increases within the synchronization interval as the extended mode value increases.

In the multi-channel access control method according to an embodiment of the disclosure, determining the multi-channel access interval based on the extended mode value includes obtaining a mode difference value between an average of extended mode values of neighboring V2X communication devices and an extended mode value of the V2X communication device, determining whether to adjust the extended mode value of the V2X communication device based on whether the mode difference value is within a first threshold range, and adjusting the extended mode value of the V2X communication device if the mode difference value is out of a preset threshold range.

In the multi-channel access control method according to an embodiment of the disclosure, adjusting the extension mode value of the V2X communication device is performed to decrease the difference between the extension mode value of the V2X communication device and the average of the extension mode values of the neighboring V2X communication devices.

In the multi-channel access control method according to an embodiment of the disclosure, determining the multi-channel access interval based on the extended mode value includes measuring a channel busy ratio (CBR) of the first service channel, determining whether to adjust the extended mode value of the V2X communication device based on whether the CBR value of the first service channel is within a second threshold range, and adjusting the extended mode value of the V2X communication device if the CBR value of the first service channel is out of the second threshold range.

In the multi-channel access control method according to an embodiment of the disclosure, adjusting the extension mode value of the V2X communication device is performed to increase the extension mode value if the CBR value of the first service channel exceeds a maximum value of the second threshold range and to decrease the extension mode value if the CBR value of the first service channel is less than a minimum value of the second threshold range.

In the multi-channel access control method according to an embodiment of the disclosure, the first service channel is used for safety-related information communication, and the second service channel is used for non-safety information communication.

To address the foregoing technical problems, according to an embodiment of the disclosure, a V2X communication device comprises a memory storing data, a communication unit transmitting and receiving a wireless signal via multi-channel access, and a processor controlling the memory and the communication unit. The processor determines a multi-channel access interval for a service channel, the multi-channel access interval determined based on an extended mode value and accesses multiple channels based on a synchronization interval and the multi-channel access interval. The synchronization interval includes a first access interval for a first service channel and a second access interval for a second service channel. The extended mode value indicates a variation in the first access interval adaptively adjusted within the synchronization interval.

In the V2X communication device according to an embodiment of the disclosure, the first access interval increases within the synchronization interval as the extended mode value increases.

In the V2X communication device according to an embodiment of the disclosure, determining the multi-channel access interval based on the extended mode value may be performed by obtaining a mode difference value between an average of extended mode values of neighboring V2X communication devices and an extended mode value of the V2X communication device, determining whether to adjust the extended mode value of the V2X communication device based on whether the mode difference value is within a first threshold range, and adjusting the extended mode value of the V2X communication device if the mode difference value is out of a preset threshold range.

In the V2X communication device according to an embodiment of the disclosure, adjusting the extension mode value of the V2X communication device may be performed to decrease the difference between the extension mode value of the V2X communication device and the average of the extension mode values of the neighboring V2X communication devices.

In the V2X communication device according to an embodiment of the disclosure, determining the multi-channel access interval based on the extended mode value may be performed by measuring a channel busy ratio (CBR) of the first service channel, determining whether to adjust the extended mode value of the V2X communication device based on whether the CBR value of the first service channel is within a second threshold range, and adjusting the extended mode value of the V2X communication device if the CBR value of the first service channel is out of the second threshold range.

In the V2X communication device according to an embodiment of the disclosure, adjusting the extension mode value of the V2X communication device may be performed to increase the extension mode value if the CBR value of the first service channel exceeds a maximum value of the second threshold range and to decrease the extension mode value if the CBR value of the first service channel is less than a minimum value of the second threshold range.

In the V2X communication device according to an embodiment of the disclosure, the first service channel may be used for safety-related information communication, and the second service channel may be used for non-safety information communication.

Advantageous Effects

According to the disclosure, channel bandwidth efficiency may be enhanced by increasing/decreasing the SCH access period based on the channel state. Further, it is possible to ensure the possibility of mutual communication in the safety channel by aligning the channel switching time in a distributed vehicle communication environment.

Use of the adaptive multichannel switching mechanism proposed in the disclosure enables adaptively increasing or decreasing the access time of the SCH1 channel, which is a safety channel, according to the degree of CBR. A higher channel efficiency may be achieved as compared to the scheme of operating multi-channels with a fixed channel access time. A non-safety channel may also be used while dynamically allocating as many channels as necessary for SCH1.

In the case of applying the disclosure, when the SCH1 channel is congested, it may be impossible to deliver as many messages as desired, and packet loss may occur due to message collision. Thus, it may be more profitable to extend and use SCH1.

BRIEF DESCRIPTION OF DRAWINGS

The accompanying drawings, that are included to provide a further understanding of the disclosure and are incorporated in and constitute a part of this specification, illustrate embodiments of the disclosure and together with the description serve to explain various principles of the disclosure.

FIG. 1 illustrates a protocol structure of an ITS system according to an embodiment of the disclosure.

FIGS. 2A and 2B illustrate channel bandwidth allocation for V2X communication according to an embodiment of the disclosure.

FIG. 3 illustrates a multi-channel operation method according to an embodiment of the disclosure.

FIG. 4 illustrates a multi-channel operation method according to another embodiment of the disclosure.

FIG. 5 is a concept view illustrating a CBR measurement scheme according to an embodiment of the disclosure.

FIG. 6 illustrates a method for adaptively adjusting an SCH1 time interval according to an embodiment of the disclosure.

FIG. 7 illustrates a change in an extended mode according to CBR according to an embodiment of the disclosure.

FIG. 8 illustrates a method for adjusting an extended mode according to an embodiment of the disclosure.

FIG. 9 illustrates a method for adjusting an extended mode according to another embodiment of the disclosure.

FIG. 10 illustrates a method for adjusting an extended mode according to another embodiment of the disclosure.

FIG. 11 illustrates a method for adjusting an extended mode according to another embodiment of the disclosure.

FIG. 12 is a flowchart illustrating a method for controlling a service channel extended mode according to an embodiment of the disclosure.

FIG. 13 is a logical block diagram illustrating a device for adjusting an extended mode according to an embodiment of the disclosure.

FIG. 14 illustrates an example of a distribution of extended modes based on CBR according to an embodiment of the disclosure.

FIGS. 15A to 15D illustrate a channel access operation according to an extended mode according to an embodiment of the disclosure.

FIG. 16 illustrates a configuration of a V2X communication device according to an embodiment of the disclosure.

FIG. 17 illustrates a method for controlling multi-channel access of a V2X communication device according to an embodiment of the disclosure.

MODE FOR CARRYING OUT THE DISCLOSURE

Preferred embodiments of the disclosure will be described in detail with reference to the accompanying drawings. The following detailed description with reference to the accompanying drawings is to illustrate preferred embodiments of the disclosure rather than illustrate only embodiments that can be implemented according to embodiments of the disclosure. The following detailed description includes details in order to provide the full understanding of the disclosure, but the disclosure does not require all of these details. The following embodiments of the disclosure do not need to be separately used. A plurality of embodiments or all embodiments may be together used, and specific embodiments may be used in combination with each other.

Most of the terms used in the disclosure are selected from common ones widely used in the corresponding field, but some terms are arbitrarily selected by the applicant and the meaning thereof will be described in detail in the following description as necessary. Therefore, the disclosure should be understood based on the intended meanings of the terms rather than the simple names or meanings of the terms.

The disclosure relates to a V2X communication device. The V2X communication device is included in an intelligent transport system (ITS) and may perform some or all of functions of the ITS system. The V2X communication device may perform communication between a vehicle and a vehicle, a vehicle and infrastructure, a vehicle and a bicycle, a vehicle and a mobile device, etc. The V2X communication device may be abbreviated to a V2X device. In one embodiment, the V2X device may correspond to an on-board unit (OBU) of a vehicle or may be included in the OBU. The OBU may be referred to as an on-board equipment (OBE). The V2X communication device may correspond to a roadside unit (RSU) of infrastructure or may be included in an RSU. The RSU may be referred to as a roadside equipment (RSE). Alternatively, the V2X communication device may correspond to an ITS station (ITS-S) or may be included in the ITS station. All of given OBU, RSU, mobile equipment, etc., that perform V2X communication may be referred to as the ITS station or the V2X communication device. In GeoNetworking communication, the V2X communication device may be referred to as a router.

The V2X communication device may communicate based on various communication protocols. The V2X communication device may implement wireless access in vehicular environments (WAVE) protocol of IEEE 1609.1-4. In this case, the V2X communication device may be referred to as a WAVE device or a WAVE communication device.

The V2X communication device may send a cooperative awareness message (CAM) or a decentralized environmental notification message (DENM). The CAM is distributed in an ITS network and provides information about at least one of a presence, a position, a communication state, or an operation state of the ITS station. The DENM provides information on a detected event. The DENM may provide information about any driving situation or an event detected by the ITS station. For example, the DENM may provide information about situations such as an emergency electronic brake lamp, a vehicle accident, a vehicle problem, a traffic condition, and the like.

FIG. 1 illustrates a protocol structure of an ITS system according to an embodiment of the disclosure.

Application layer: the application layer may implement and support various use cases. For example, an application may provide road safety, efficient traffic information, and other application information.

Facilities layer: the facilities layer may support to effectively implement the various use cases defined in the application layer. For example, the facilities layer may perform application support, information support, and session/communication support.

Access layer: the access layer may transmit the message/data received at the upper layers through a physical channel. For example, the access layer may perform/support data communication based on an IEEE 802.11 and/or 802.11p standards-based communication technology, an ITS-G5 wireless communication technology based on a physical transmission technology of the IEEE 802.11 and/or 802.11p standards, a 2G/3G/4G(LTE)/5G wireless cellular communication technology including satellite/broadband wireless mobile communication, a broadband terrestrial digital broadcasting technology such as DVB-T/T2/ATSC, a GPS technology, an IEEE 1609 WAVE technology, and the like.

Networking and transport layer: the networking/transport layer may configure a network for vehicle communication between homogenous/heterogeneous networks by using various transport protocols and networking protocols.

The transport layer is a connection layer between services provided by the upper layers (session layer, presentation layer, and application layer) and the lower layers (networking layer, data link layer, and physical layer). The transport layer may manage transmitted data to exactly arrive at a destination. At the transmitting side, the transport layer may process data into packets of an appropriate size for efficient data transmission, and at the receiving side, the transport layer may perform processing to recover the received packets to an original file. In an embodiment, protocols such as transmission control protocol (TCP), user datagram protocol (UDP), and basic transport protocol (BTP) may be used as a transport protocol.

The network layer may manage a logical address and may determine a delivery path of the packet. The network layer may receive the packet generated in the transport layer and may add the logical address of the destination to a network layer header. In an embodiment, the packet path may be considered for unicast/broadcast between vehicles, between vehicles and fixed stations, and between fixed stations. In an embodiment, GeoNetworking, IPv6 networking with mobility support, IPv6 over GeoNetworking, etc. may be considered as the networking protocol.

The ITS architecture may further include a management layer and a security layer.

For vehicular ad hoc network (VANET) for V2X communication, 70 Mhz is allocated to the 5.6 GHz bandwidth. The allocated bandwidth may be allocated in units of 10 MHz.

FIGS. 2A and 2B illustrate channel bandwidth allocation for V2X communication according to an embodiment of the disclosure.

FIG. 2A illustrates channel bandwidth allocation in the United States, and FIG. 2B illustrates channel bandwidth allocation in Europe.

As illustrated in FIG. 2A, in the case of the United States, a safety service may be provided using CH172. As illustrated in FIG. 2B, in the case of Europe, a safety service may be provided using CH180. The seven channels may include six service channels (SCH) and one control channel (CCH).

The control channel (CCH) refers to a radio channel used to exchange management frames and/or WAVE messages. The WAVE message may be a WAVE short message (WSM). The service channel (SCH) is a radio channel used to provide service and refers to any channel that is not the control channel According to an embodiment, the control channel may be used to communicate system management messages, such as WAVE service advertisements (WSAs), or WAVE short message protocol (WSMP) messages. The SCH may be used for general-purpose application data communication, and such general-purpose application data communication may be coordinated by service-related information such as WSA.

WSA may also be referred to hereinafter as service advertisement information. WSA may provide information including an announcement of the availability of application-service. The WSA message may identify and describe the application service and the channel accessible by the service. According to an embodiment, WSA may include a header, service information, channel information, and WAVE routing advertisement information.

The service advertisement information for service access may be a periodic message. As an embodiment, Co-operative Awareness Messages (CAM) may be periodic messages. CAMs may be periodically broadcasted by the facility layer.

Decentralized Environmental Notification Messages (DENM) may be event messages. Event messages may be triggered and transmitted by detection of an event. Service messages may be sent to manage the session. In the following embodiments, the event message may include a safety message/information. The service message may include a non-safety message/information.

The V2X communication device may broadcast a cooperative awareness message (CAM) or a decentralized environmental notification message (DENM).

The CAM is distributed in the ITS network and provides information for at least one of presence, location, and communication status of the ITS station. DENM provides information for detected events. DENM may provide information for any driving situation or event detected by the ITS station. For example, DENM may provide information for situations, such as emergency electronic brakes, vehicle accidents, vehicle problems, traffic conditions, and the like.

In the case of EU, channels CH 176, CH178, and CH180 are grouped into ITS-G5A and are assigned as channels for road safety. Channels CH172 and CH174 are grouped into ITS-G5B and are allocated as channels for road traffic efficiency. CH182 and CH184 are channels for future extension and their special usage is not yet defined. The usage for road safety is much more important than the channel for road traffic efficiency, and different maximum power limit for each channel may be set. Currently, both EU and US operate a single channel. However, services using multiple channels will be provided for bandwidth extension in the future, and in this case, multi-channel operation methods may be an important issue.

FIG. 3 illustrates a multi-channel operation method according to an embodiment of the disclosure.

In Europe, V2X devices using one transceiver tune only CCH to receive safety information. Multiple channels may be accessed by V2X devices using multiple transceivers. The multiple transceivers may correspond to dual transceivers.

The V2X device using the dual transceivers may operate as illustrated in FIG. 3. That is, a first transceiver Transceiver 1 of the V2X device may always tune the CCH, and a second transceiver Transceiver 2 may perform channel switching. As illustrated in FIG. 3, the second transceiver may sequentially access SCH1, SCHx, SCH1, and SCHy. SCH1 is a channel for transmitting safety-related services. The V2X device may transmit and receive safety-related information that has not been delivered on CCH by periodically tuning SCH1 using the second transceiver.

FIG. 4 illustrates a multi-channel operation method according to another embodiment of the disclosure.

In the case of the U.S., multi-channel operation methods include four methods as illustrated in FIG. 4.

The multi-channel operation methods include a continuous mode (a), an alternating access mode (b), an immediate mode (c), and an extended access mode (d). In the continuous mode (a), the V2X device continuously tunes the CCH or SCH. In the cross-access mode (b), the V2X device alternately and repetitively tunes the CCH and SCH for a predetermined time. In the immediate mode (c), the V2X device may tune to the CCH and then tune to the SCH regardless of a predetermined time slot. In the extended access mode (d), the V2X communication device may not periodically tune the CCH but may continuously tune the SCH.

The synchronous interval starts at the time when one unit second begins. One second may include an integer number of synchronization intervals. The synchronization interval may include a plurality of time slots. As an embodiment, the synchronization interval may include two time slots having a length of 50 ms.

As an embodiment, the first V2X device may access the CCH during time slot 0 and access the SCH during type slot 2. The second V2X device may access the SCH during time slot 0 and access the CCH during type slot 1. Thereafter, the second V2X device may access the SCH during type slot 0 and may access another SCH during type slot 1.

Meanwhile, in the ITS-G5 standard or the IEEE 1609 standard, the access layer uses the IEEE 802.11p access layer technology. In the 802.11p technology, when the channel load is increased by a certain amount or more, the communication performance may be drastically reduced. Therefore, to efficiently control the access layer, a decentralized congestion control (DCC) algorithm is used. The DCC algorithm is operated in such a manner as to reduce the channel load as the V2X device measures and shares the channel busy ratio (CBR) of the used channel and each V2X device controls the transmission period or transmission power based on the CBR information.

CBR information is traffic load status information defined as the ratio of the channel's busy interval to the observation interval. The CBR information may be used to determine the channel busy status for vehicles in the same network. The channel busy ratio (CBR) information may denote a time-dependent value of 0 or more and 1 or less indicating a fraction of the time when the corresponding channel is busy.

The CBR value may be transferred through the networking packet header. All the V2X devices broadcast the maximum CBR value among the CBR values received from neighboring V2X devices in their communication coverage and the CBR values they have measured on their own. The receiving V2X device obtains a global CBR value using the broadcast CBR information. The global CBR value may be calculated as in Equation 1 below.

$$\text{Global CBR} = \max\{CBR\_L\_0\_Hop, CBR\_L\_1\_Hop, CBR\_L\_2\_Hop\} \quad \text{[Equation 1]}$$

CBR_L_0_Hop: The CBR value measured by the router itself for a certain period of time CBR_L_1_Hop: Maximum CBR_R_0_Hop received from the neighbor router for a certain period of time CBR_L_2_Hop: Maximum CBR_R_0_Hop received from the neighbor router for a certain period of time CBR_R_0_Hop: The CBR measured by the router itself for a certain period of time. That is, if CBR_R_0_Hop is broadcast, it is CBR_L_1_Hop from the receiver's point of view.

CBR_R_1_Hop: The maximum value of the received 1-hop neighboring CBR values. That is, if CBR_R_1_Hop is broadcast, it is CBR_L_2_Hop from the receiver's point of view.

FIG. 5 is a concept view illustrating a CBR measurement scheme according to an embodiment of the disclosure.

In FIG. 5, each dot denotes a V2X communication device, and the V2X communication device may be referred to as a node.

As in the above equation, the V2X device uses the value corresponding to the maximum value among the CBRs of the 2-hop interval as the global CBR value. In FIG. 5, node A obtains the global CBR value using a 2-hop distance, that is, CBR values within the CBR measurement interval of node C.

The V2X device may map the corresponding value to a specific DCC status based on the global CBR value and operate according to the mapped channel condition. As for the mapping table for DCC status and channel load, an embodiment as illustrated in Table 1 below may be used.

TABLE 1

| State | Channel load | Packet rate | Offset time (T_off) |
|---|---|---|---|
| Relaxed | <30% | 10 Hz | 100 ms |
| Active 1 | 30% to 39% | 5 Hz | 200 ms |
| Active 2 | 40% to 49% | 2.5 Hz | 400 ms |
| Active 3 | 50% to 60% | 2 Hz | 500 ms |
| Restrictive | 60% | 1 Hz | 1000 ms |

The packet rate and offset time are varied based on the state of the channel. The offset time may be specifically profiled according to the message. It may be understood that the transmission rate of the periodic message is determined according to the channel state.

If there is no predetermined scheme when communication is performed using channel switching, communication between V2X devices may be difficult. In particular, V2X communication requires that the communication possibility of the safety channel be guaranteed. If channel switching is always performed sequentially at fixed time intervals, the channel use efficiency cannot exceed 50%. When channel switching is performed at fixed time intervals as illustrated in FIGS. 2 and 3, the efficiency of channel use may be degraded. However, if only the safety channel is tuned considering the importance of safety, the use efficiency of the non-safe channel may be 0%. Accordingly, a description will be given of a channel switching method and a method for transmitting the channel switching method below.

Hereinafter, in a multi-channel operation performing channel switching, a method for adaptively adjusting a switching interval of a safety channel based on a DCC state is described. According to the disclosure, channel bandwidth efficiency may be enhanced by increasing/decreasing the SCH access period based on the channel state. Further, it is possible to ensure the possibility of mutual communication in the safety channel by aligning the channel switching time in a distributed vehicle communication environment.

In the multi-channel operation in the V2X environment, the safe channel has a higher priority than the non-safe channel. In the interval in which the number of messages to be transmitted via the safety channel increases, the safety channel needs to be extended and used. Using the safe interval/non-safe interval as a fixed time is inefficient in terms of channel usage. The channel use efficiency may be increased by increasing the safety interval in the interval where more safety messages need to be transmitted while increasing the non-safety interval in the other intervals. For example, for mutual safety when passing through an intersection, the V2X device may transmit and receive more safety messages. However, in a common driving situation, the V2X device may receive a non-safety message to increase the efficiency of driving the vehicle and to use various services.

The V2X device may transmit a safety-related message on the CCH channel. However, higher layers of the access layer generate messages regardless of DCC when an event occurs. The generated message may be removed or offloaded based on a DCC operation in the access layer. The message may be offloaded from CCH to SCH1. When offloaded based on the DCC operation even on SCH1, the message may be offloaded from SCH1 to SCH2. Depending on the amount of offloaded data, the usage of the service channel may vary. For example, when the amount of data offloaded from the CCH increases, the degree of usage of SCH1 may increase. As another example, when the amount of data offloaded from the CCH is small, SCH1 may be hardly used.

In the disclosure, the safety message may be a decentralized environmental notification message (DENM), a cooperative awareness message (CAM), a signal phase and timing (SPaT), a MAP, as well as a cooperative adaptive cruise control (C-ACC) message, a platooning message, a cooperative perception message (CPM), or a maneuver coordination message (MCM). The safety message may correspond to a message provided by a safety-related service.

FIG. 6 illustrates a method for adaptively adjusting an SCH1 time interval according to an embodiment of the disclosure.

The V2X device may access the CCH via the first transceiver and access the SCH via the second transceiver. SCH1 denotes a first service channel through which safety-related messages are transmitted. The SCH1 access interval may be adaptively adjusted. However, the SCH1 access interval may be extended from the synchronization interval. That is, the access interval of SCH1 may be adjusted starting with the synchronization interval that is a default time interval of SCH1. When the SCH1 channel state is busy, the SCH1 access interval may be extended up to the non-SCH1 interval. The extended interval may be divided into n intervals. The access interval refers to a time period during which the transceiver tunes to and accesses a specific channel.

When the default access interval of SCH1 is busy, the V2X device may extend the access interval for SCH1 and access the SCH1 channel during the extended SCH1 interval. The degree of extension of the access interval may be indicated as an extended mode or an extended mode value. If the value/stage of the extended mode increases and the amount of transmission messages is the same, the CBR of SCH1 may be lowered. If SCH1 is in the busy state even after the extended mode value is increased, the amount of the safety messages to be transmitted is large, and thus, the extended mode value may be increased by one step. If the channel is determined to be non-busy in stage X of the extended mode, the number of stages of the extended mode may be reduced. The extended mode may be reduced up to stage 0, which is the default extended mode.

In FIG. 6, the extended mode may include stages 0 to n. Stage 0 of the extended mode denotes the default SCH1 access interval, which indicates a default interval in which the access interval is not extended according to the CBR. However, all the V2X devices may not simultaneously move to the desired extended mode. However, it is desirable to minimize the difference from the extended modes of the surrounding V2X devices. This is because the message/communication loss may be reduced only when adjacent V2X vehicles perform communication in the same SCH1 interval.

FIG. 7 illustrates a change in an extended mode according to CBR according to an embodiment of the disclosure.

As an embodiment, a common CBR threshold may be set for the above-described extended mode operation. For example, the maximum value of the CBR threshold may be set to 0.6, which is the boundary value between the restrictive state of DCC and the active 3 state, and the minimum value of the CBR threshold may be set to 0.4, which is the boundary value between the active 1 state and the active 2 state.

When the measured global CBR value exceeds the CBR threshold maximum value (CBR threshold max), the node may increase its current extended mode by one level. Since the global CBR value is obtained using the maximum CBR value measured by a node at a distance of 2 hops, it may be expected that neighboring nodes also obtain similar levels of global CBR. That is, the neighboring nodes may also set their extended mode to a mode that is one level higher than the previous mode at a similar time.

When a plurality of nodes extend the SCH1 interval, the measurement interval for DCC is also increased. Therefore, when packets are generated at the same data rate, the global CBR may be reduced. In this state, when the generation rate of the safety message to be transmitted again overall increases, and the global CBR exceeds the maximum CBR threshold, the node increases the extended mode being used by one step. As an embodiment, when the extended mode increases up to mode n, all the entire intervals are used for safe channel communication.

When the measured global CBR value is less than the CBR threshold minimum value (CBR threshold min), the node may reduce its own extended mode by one step. When it is assumed that neighboring nodes have similar global CBR values, the total global CBR may increase because the interval of SCH1 available has decreased. If the measured global CBR value is less than the CBR threshold min, the node may again reduce its extended mode by one step. If the extended mode is 0, the extended mode is no longer reduced.

Extending the SCH1 interval may bring about effects similar to those obtained when the bandwidth increases. Therefore, the extension of the SCH1 interval may affect the CBR value. Instead of adaptively increasing the safety interval, it may be operated by turning on/off. In this case, CBR may rapidly change and control may be difficult. In the case of the on/off method, some vehicles within the coverage may be operated with a fully safe channel, and other vehicles may be operated by a channel switching method. In this case, the interval in which mutual communication is impossible may be lengthened.

In addition to the extension/reduction of the above-described extended mode, each node may add and share its own extended mode value to the geonetworking header during single-hop broadcasting. That is, the V2X vehicle may include the value of the extended mode in operation in the packet and transmit the same.

Following the extension/reduction of the extended mode described above, a method for reducing the difference in extended mode from the neighboring nodes is described below.

The node obtains an average value of the extended modes of neighboring nodes and obtains a mode difference value (Diff_mode) that is obtained by subtracting the value of the extended mode in which the node is operating from the average value. The node may change its own extended mode based on the mode difference value. The node may adjust the mode value based on the average value if the mode difference value is outside a specific threshold range.

If the mode difference value is a positive value and is greater than or equal to a diff_up_threshold, the node may determine that a ceiling value (ceiling (avg (Extended mode))) of the average value is its extended mode. For example, if the diff_up_threshold is 0.8, its own extended mode is 1, and the average value of the extended modes of neighboring nodes is 1.9, then the node may change its extended mode to 2. Since the extended mode is changed close to the extended mode of the neighboring nodes, the interval in which communication is impossible may be reduced.

If the difference value is a negative value and is less than or equal to a diff_down_threshold, then the node may determine that a ceiling value (ceiling(avg(Extended mode))) of the average value is its extended mode. The diff_down_threshold may be determined conservatively. That is, the reduction in interval of the safety channel switching may be performed more slowly. For example, if the diff_down_threshold is −1.2, its own extended mode is 2, and the average value of the extended modes of neighboring nodes is 0.7, then the difference, i.e., −1.3, between the average value of the neighboring nodes and its own extended mode is smaller than the threshold (−1.2). Accordingly, the node may determine that its extended mode is 1, which is the ceiling value (ceiling(avg(Extended mode))) of the average value.

The diff_up_threshold and the diff_down_threshold are related to how dependent the degree of mode variation is on the variations in neighboring modes. For example, as the absolute values of the diff_up_threshold and the diff_down_threshold are determined to be larger, the extended mode interval between neighboring nodes increases and the changes in the extended modes of the neighboring nodes slow down. As an embodiment, to reduce too frequent fluctuations, the diff_up_threshold may be set to 0.8, and the diff_down_threshold may be set to −1.2. An example operation for the threshold is described below.

FIG. 8 illustrates a method for adjusting an extended mode according to an embodiment of the disclosure.

FIG. 8 illustrates an example in which the diff_up_threshold is 0.8, the average value of the extended modes of neighboring nodes is 2.4, and the node's own extended mode value is 2.

The mode difference value (Diff_mode), which is the difference between the average value and its own extended mode value, is 2.4−2=0.4. Since the difference value is positive and is less than the diff_up_threshold, changing reflecting the extended mode values for the surroundings is not performed. When the mode difference value is less than the diff_up_threshold (Diff_mode<diff_up_threshold), the node may adjust the extended mode based on the CBR of SCH1 measured by the node regardless of the extended mode of the neighboring nodes.

The node calculates the CBR value of SCH1. If the CBR value of SCH1 is less than the CBR threshold maximum value (CBR_sch1<CBR_threshold_max), the channel is identified as non-busy. Therefore, the node maintains extended mode 2. If the CBR value of SCH1 is greater than the CBR threshold maximum value (CBR_sch1≥CBR_threshold_max), the channel is identified as busy. Therefore, the node changes the extended mode to 3.

FIG. 9 illustrates a method for adjusting an extended mode according to another embodiment of the disclosure.

FIG. 9 illustrates an example in which the diff_up_threshold is 0.8, the average value of the extended modes of neighboring nodes is 2.9, and the node's own extended mode value is 2.

The mode difference value (Diff_mode), which is the difference between the average value and its own extended mode value, is 2.9−2=0.9. Since the difference value is positive and is larger than the diff_up_threshold, changing reflecting the extended mode values for the surroundings is performed. The extended mode value is adjusted to 3, which is the ceiling value of the average value of the extended modes of neighboring nodes. In this embodiment, the node adjusts its own extended mode value with the extended mode values used by multiple neighboring nodes, regardless of the CBR value for SHC1 determined by the node.

FIG. 10 illustrates a method for adjusting an extended mode according to another embodiment of the disclosure.

FIG. 10 illustrates an example in which the diff_up_threshold is 1.2, the average value of the extended modes of neighboring nodes is 2.9, and the node's own extended mode value is 2.

The mode difference value (Diff_mode), which is the difference between the average value and its own extended mode value, is 2.9−2=0.9. Since the difference value is positive and is less than the diff_up_threshold, changing reflecting the extended mode values for the surroundings is not performed. When the mode difference value is less than the diff_up_threshold (Diff_mode<diff_up_threshold), the node may control the extended mode based on the CBR of SCH1 measured by the node regardless of the extended mode of the neighboring nodes.

The node calculates the CBR value of SCH1. If the CBR value of SCH1 is less than the CBR threshold maximum value (CBR_sch1<CBR_threshold_max), the channel is identified as non-busy. Therefore, the node maintains extended mode 2. If the CBR value of SCH1 is greater than the CBR threshold maximum value (CBR_sch1≥CBR_threshold_max), the channel is identified as busy. Therefore, the node changes the extended mode to 3.

The embodiment of FIG. 10 has a higher diff_up_threshold than the embodiment of FIG. 9. As a result, while the extended mode value is immediately increased in the embodiment of FIG. 9, the extended mode value may be maintained according to the CBR value of SCH1 in the embodiment of FIG. That is, since the diff_up_threshold is larger, the increase in extended mode may proceed slowly. However, it may increase the difference in extended mode from the neighboring nodes.

FIG. 11 illustrates a method for adjusting an extended mode according to another embodiment of the disclosure.

FIG. 11 illustrates an example in which the diff_down_threshold is −1.2, the average value of the extended modes of neighboring nodes is 2.4, and the node's own extended mode value is 3.

The mode difference value (Diff_mode), which is the difference between the average value and its own extended mode value, is 2.9−3=−0.6. Since the difference value is negative and is larger than the diff_down_threshold, changing reflecting the extended mode values for the surroundings is not performed. When the mode difference value which is a negative value is less than the diff_down_threshold (Diff_mode<diff_down_threshold), the node may control the extended mode based on the CBR of SCH1 measured by the node regardless of the extended mode of the neighboring nodes.

The node calculates the CBR value of SCH1. If the CBR value of SCH1 is less than the CBR threshold minimum value (CBR_sch1<CBR_threshold_min), the channel is identified as non-busy. Therefore, the node changes the extended mode to 2. If the CBR value of SCH1 is greater than or equal to the CBR threshold minimum value (CBR_sch1≥CBR_threshold_min), the channel is identified as busy. Therefore, the node maintains extended mode 3.

In an embodiment of the disclosure, the order of the method for adjusting the extended mode based on the CBR value of the service channel and the method for adjusting the extended mode based on the neighboring extended mode values may be changed. That is, unlike the embodiments of FIGS. 8 to 11, after the extended mode adjustment based on the CBR value of the service channel is performed, the extended mode adjustment based on the extended mode values of neighboring nodes may be performed.

FIG. 12 is a flowchart illustrating a method for controlling a service channel extended mode according to an embodiment of the disclosure.

The V2X device obtains a global CBR (CBRsch1) and a mode difference value (diff_mode) for SCH1 (S12010). The mode difference value is obtained by subtracting the V2X device's own extended mode value from the average value of the extended mode values of the surrounding V2X devices (diff_mode=avg(Extended_i)−self_extended_mode).

The V2X device determines whether the mode difference value is within a predetermined threshold (S12020). The V2X device may determine whether the mode difference value is within a range from a diff_down_threshold to a diff_up_threshold (diff_down_threshold<diff_mode<diff_up_threshold).

When the mode difference value is outside the range of the predetermined thresholds, the V2X device adjusts its own extended mode (S12030). The V2X device may adjust its own extended mode value to the ceiling value of the average value of the extended mode values of the surrounding V2X devices (self_extended_mode=ceiling(avg(Extended_i))).

When the mode difference value is within the range of the predetermined thresholds, the V2X device adjusts its own extended mode based on its own CBR specific value (S12040 to S12080).

When the mode difference value is outside the range of the predetermined thresholds, the V2X device determines whether the measured CBR value for SCH1 is within the CBR threshold range (S12040). The V2X device may determine whether the CBR value for SCH1 is within the range from the CBR threshold minimum value to the CBR threshold maximum value (CBR_threshold_min<CBRsch1<CBR_threshold_max).

When the CBR value for SCH1 is within the range from the CBR threshold minimum value to the CBR threshold maximum value, the V2X device maintains the current extended mode (S12050).

When the CBR value for SCH1 is outside the range from the CBR threshold minimum value to the CBR threshold maximum value, the V2X device may adjust the current extended mode (S12060 to S12080).

The V2X device may determine whether the CBR value for SCH1 is greater than the CBR threshold maximum value (CBRsch1>CBR_threshold_max) (S12060). When the CBR value for SCH1 is greater than the CBR threshold maximum value, the V2X device may increase the current extended mode (S12070). That is, the SCH1 access interval may be increased by one unit adaptive time slot.

The V2X device may determine whether the CBR value for SCH1 is less than the CBR threshold minimum value (CBRsch1<CBR_threshold_min) (S12080). When the CBR value for SCH1 is less than the CBR threshold minimum value, the V2X device may decrease the current extended mode (S12090). That is, the SCH1 access interval may be reduced by one unit adaptive time slot.

As described above, the diff_up_threshold and the diff_down_threshold are related to how dependent the degree of mode variation is on the variations in mode of neighboring V2X devices. For example, as the absolute value of diff_up_threshold/diff_down_threshold increases, the interval between the extended modes increases, and the variations in neighboring nodes slowly follow. In the disclosure, diff_up_threshold=0.8 and diff_down_threshold=−1.2 are proposed to reduce too frequent fluctuations.

FIG. 13 is a logical block diagram illustrating a device for adjusting an extended mode according to an embodiment of the disclosure.

The system of the V2X device may include a plurality of layers as illustrated in FIG. 1. In the disclosure, the network layer, the geonetworking layer, and the access layer of the V2X device may perform extended mode adjustment.

The management layer includes a DCC cross block (DCC Cross).

The geonetworking layer includes a global CBR block (Global CBR) and an extended mode decision block (Extended Mode Decision).

The access layer includes a MAC channel switch control block (MAC channel switch control).

The CBR value measured by the access layer is changed to a parameter that may internally be used in the management layer and transmitted to the geonetworking layer. The geonetworking layer may measure the global CBR using the value transmitted from a neighboring node through the geonetworking layer and the value transmitted from the management layer. This value is transferred to the extended mode decision block (Extended Mode Decision). The extended mode decision block (Extended Mode Decision) determines an extended mode that it is to use according to the mode decision flowchart as illustrated in FIG. 12 and transmits the extended mode to the access layer. The MCA channel switch control block (MAC channel switch control) of the access layer which receives the extended mode issues a channel switching command to tune SCH1 during an interval of tuning SCH1 and tune non-SCH1 during an interval corresponding to non-SCH1 according to the received value.

FIG. 14 illustrates an example of a distribution of extended modes based on CBR according to an embodiment of the disclosure.

In FIG. 14, dots represent nodes, and numbers represent extended mode values.

As illustrated in FIG. 14, as the CBR value decreases, the extended mode may decrease. In an actual V2X environment, since the highest value among CBR values of the 2-hop distance is determined as the global CBR value, the extended mode values may be distributed to have less change than that of FIG. 14. For convenience, FIG. 14 illustrates an example in which the extended mode sharply changes in each coverage.

FIGS. 15A to 15D illustrate a channel access operation according to an extended mode according to an embodiment of the disclosure.

FIG. 15A illustrates the channel access interval of extended mode 1, FIG. 15B illustrates the channel access interval of extended mode 2, FIG. 15C illustrates the channel access interval of extended mode 3, and FIG. 15D illustrates the channel access interval of extended mode 4. In the embodiment of FIGS. 15A to 15D, the extended mode interval for SCH1 includes four stages. In extended mode 4, the V2X device continuously tunes and accesses SCH1 during one synchronization interval.

As illustrated in FIGS. 15A to 15D, even when the distribution of the extended modes rapidly changes, the safety interval in which mutual communication is impossible within one coverage is the time of one unit extended mode. The interval in which mutual communication is impossible may be determined by the diff_up_threshold and the diff_down_threshold as described above. As in the above-described embodiment, when diff_up_threshold is 0.8 and diff_down_threshold is 1.2, path loss between specific nodes may occur as long as the time of up to two units of extended mode. In other words, there may be a time in which communication between nodes is partially unavailable during this time.

However, as SCH1, which is a safety channel, is extended and used, congestion of SCH1 may be addressed while a non-safety message may be transmitted/received. Further, in areas where safety is important in terms of channel use efficiency, the V2X device may use SCH1 fully or to the maximum. In other areas, the V2X device may use SCH1 for the default interval alone while using other channels in the other intervals and, in this sense, channel efficiency may be enhanced.

FIG. 16 illustrates a configuration of a V2X communication device according to an embodiment of the disclosure.

Referring to FIG. 16, a V2X communication device 16000 may include a communication unit 16010, a processor 16020, and a memory 16030.

The communication unit 16010 may be connected with the processor 16020 to transmit/receive wireless signals. The communication unit 16010 may up-convert data received from the processor 16020 into a transmission/reception band and transmit the signal or may down-convert the received signal. The communication unit 16010 may implement the operation of at least one of the physical layer or access layer.

The communication unit 16010 may also include a plurality of sub RF units to perform communication according to a plurality of communication protocols. According to an embodiment, the communication unit 16010 may perform data communication based on, e.g., dedicated short range communication (DSRC), IEEE 802.11 and/or 802.11p standard physical transmission technology-based ITS-G5 wireless communication technology, 2G/3G/4G (LTE)/5G wireless cellular communication technology including satellite/wideband wireless mobile communication, DVB-T/T2/ATSC or other wideband terrestrial digital broadcast technology, GPS technology, or IEEE 1609 WAVE technology. The communication unit 16010 may include a plurality of transceivers implementing each communication technology. Further, one of the plurality of transceivers may access the control channel, and the other transceiver may access the service channel.

The processor 16020 may be connected with the communication unit 16010 to implement the operation of the layers according to the ITS system or WAVE system. The processor 16020 may be configured to perform operations according to various embodiments of the disclosure as described with reference to the drawings. Further, according to various embodiments of the disclosure, at least one of a module, data, program, or software for implementing the operation of the V2X communication device 16000 may be stored in the memory 16030 and be executed by the processor 16020.

The memory 16030 is connected with the processor 16020 to store various pieces of information for driving the processor 16020. The memory 16030 may be included in the processor 16020 or be installed outside the processor 16020 and connected with the processor 16020 via a known means.

The processor 16020 of the V2X communication device 16000 may perform the geonetworking packet transmission described herein. A method for transmitting geonetworking packets by the V2X communication device 16000 is described below.

FIG. 17 illustrates a method for controlling multi-channel access of a V2X communication device according to an embodiment of the disclosure.

The V2X communication device may determine a multi-channel access interval (S17010).

The multi-channel access interval is determined based on the above-described extended mode. The extended mode may be expressed as an extended mode value or an extended mode stage.

The V2X communication device performs multi-channel access based on the synchronization interval and the multi-channel interval (S17020). Multi-channel access refers to access to multiple channels and transmission and reception of service data. The V2X communication device may access the CCH via one transceiver and access the SCH via another transceiver. SCH access may be switched between channels based on the synchronization interval and the multi-channel interval. However, in an embodiment of the disclosure, SCH access may be maintained to SCH1 during the synchronization interval according to the extended mode.

As illustrated in FIGS. 6 and 15, in the case of service channel access, the synchronization interval includes a first access interval for a first service channel and a second access interval for a second service channel. The extended mode value may denote a variation in the first access interval that is adaptively adjusted within the synchronization interval. As described above, the extended mode value may indicate the unit of the access interval for the increased first service channel. As the extended mode value increases, the first access interval may increase within the synchronization interval.

The first service channel may be used for safety-related service communication, and the second service channel may be used for non-safety service communication. The first service channel may correspond to the above-described SCH1, and the second service channel may correspond to the above-described SCHx or SCHy.

Determining (17010) the multi-channel access interval based on the extended mode value may include obtaining a mode difference value between an average of extended mode values of neighboring V2X communication devices and an extended mode value of the V2X communication device, determining whether to adjust the extended mode value of the V2X communication device based on whether the mode difference value is within a first threshold range, and adjusting the extended mode value of the V2X communication device if the mode difference value is out of a preset threshold range. Adjusting the extended mode value may be performed to decrease the difference between the extended mode value of the V2X communication device and the average of the extended mode values of the neighboring V2X communication devices. For a detailed description of the adjustment of the extended mode value, refer to the description made above in connection with FIGS. 6 to 12.

Determining (17010) the multi-channel access interval based on the extended mode value may include measuring a channel busy ratio (CBR) of the first service channel, determining whether to adjust the extended mode value of the V2X communication device based on whether the CBR value of the first service channel is within a second threshold range, and adjusting the extended mode value of the V2X communication device if the CBR value of the first service channel is out of the second threshold range. Adjusting the extended mode value may be performed to increase the extended mode value if the CBR value of the first service channel exceeds a maximum value of the second threshold range and to decrease the extended mode value if the CBR value of the first service channel is less than a minimum value of the second threshold range. The CBR value may correspond to the global CBR value. For a detailed description of the adjustment of the extended mode value, refer to the description made above in connection with FIGS. 6 to 12.

The order of adjustment of the extended mode value using the mode difference value and the adjustment of the extended mode value using the CBR value of the service channel may be changed depending on implementations. As an embodiment, after the extended mode value is adjusted using the mode difference value, the extended mode value may be adjusted using the CBR value of the service channel. As another embodiment, after the extended mode value using the CBR value of the service channel is adjusted, the extended mode value using the mode difference value may be adjusted.

The embodiments described above are implemented by combinations of components and features of the disclosure in predetermined forms. Each component or feature should be considered selectively unless specified separately. Each component or feature may be carried out without being combined with another component or feature. Moreover, some components and/or features are combined with each other and can implement embodiments of the disclosure. The order of operations described in embodiments of the disclosure may be changed. Some components or features of one embodiment may be included in another embodiment, or may be replaced by corresponding components or features of another embodiment. It is apparent that some claims referring to specific claims may be combined with another claims referring to the claims other than the specific claims to constitute the embodiment or add new claims by means of amendment after the application is filed.

Embodiments of the disclosure can be implemented by various means, for example, hardware, firmware, software, or combinations thereof. When embodiments are implemented by hardware, one embodiment of the disclosure can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and the like.

When embodiments are implemented by firmware or software, one embodiment of the disclosure can be implemented by modules, procedures, functions, etc. performing functions or operations described above. Software code can be stored in a memory and can be driven by a processor. The memory is provided inside or outside the processor and can exchange data with the processor by various well-known means.

It is apparent to those skilled in the art that the disclosure can be embodied in other specific forms without departing from essential features of the disclosure. Accordingly, the aforementioned detailed description should not be construed as limiting in all aspects and should be considered as illustrative. The scope of the disclosure should be determined by rational construing of the appended claims, and all modifications within an equivalent scope of the disclosure are included in the scope of the disclosure.

Mode for Disclosure

It is obvious to those skilled in the art that the disclosure can be changed and modified in various ways without departing from the spirit or range of the disclosure. Accordingly, the disclosure is intended to include all the changes and modifications provided by the appended claims and equivalents thereof.

In the disclosure, both the device and method disclosures have been mentioned, and the descriptions of both the device and method disclosures can be complementarily applied.

Various embodiments have been described in the best form for implementing the disclosure.

INDUSTRIAL APPLICABILITY

The disclosure is used in a series of vehicle communication fields.

It is obvious to those skilled in the art that the disclosure can be changed and modified in various ways without departing from the spirit or range of the disclosure. Accordingly, the disclosure is intended to include all the changes and modifications provided by the appended claims and equivalents thereof.

The invention claimed is:

1. A method for controlling multi-channel access by a V2X communication device, the method comprising:
   determining a multi-channel access interval for a service channel, the multi-channel access interval determined based on an extended mode value; and
   accessing multiple channels based on a synchronization interval and the multi-channel access interval, wherein
   the synchronization interval includes a first access interval for a first service channel and a second access interval for a second service channel, and wherein
   the extended mode value indicates a variation in the first access interval adaptively adjusted within the synchronization interval.

2. The method of claim 1, wherein
   the first access interval increases within the synchronization interval as the extended mode value increases.

3. The method of claim 1, wherein
   determining the multi-channel access interval based on the extended mode value includes:
   obtaining a mode difference value between an average of extended mode values of neighboring V2X communication devices and an extended mode value of the V2X communication device;
   determining whether to adjust the extended mode value of the V2X communication device based on whether the mode difference value is within a first threshold range; and
   adjusting the extended mode value of the V2X communication device if the mode difference value is out of a preset threshold range.

4. The method of claim 3, wherein
   adjusting the extended mode value of the V2X communication device is performed to decrease the difference between the extended mode value of the V2X communication device and the average of the extended mode values of the neighboring V2X communication devices.

5. The method of claim 1, wherein
   determining the multi-channel access interval based on the extended mode value includes:
   measuring a channel busy ratio (CBR) of the first service channel;
   determining whether to adjust the extended mode value of the V2X communication device based on whether the CBR value of the first service channel is within a second threshold range; and
   adjusting the extended mode value of the V2X communication device if the CBR value of the first service channel is out of the second threshold range.

6. The method of claim 5, wherein
   adjusting the extended mode value of the V2X communication device is performed to increase the extended mode value if the CBR value of the first service channel exceeds a maximum value of the second threshold range and to decrease the extended mode value if the CBR value of the first service channel is less than a minimum value of the second threshold range.

7. The method of claim 1, wherein
   the first service channel is used for safety-related information communication, and the second service channel is used for non-safety information communication.

8. A V2X communication device, comprising:
   a memory storing data;
   a communication unit transmitting and receiving a wireless signal via multi-channel access; and
   a processor controlling the memory and the communication unit, wherein
   the processor:
   determines a multi-channel access interval for a service channel, the multi-channel access interval determined based on an extended mode value; and
   accesses multiple channels based on a synchronization interval and the multi-channel access interval, wherein
   the synchronization interval includes a first access interval for a first service channel and a second access interval for a second service channel, and wherein
   the extended mode value indicates a variation in the first access interval adaptively adjusted within the synchronization interval.

9. The V2X communication device of claim 8, wherein
   the first access interval increases within the synchronization interval as the extended mode value increases.

10. The V2X communication device of claim 8, wherein
    determining the multi-channel access interval based on the extended mode value is performed by:
    obtaining a mode difference value between an average of extended mode values of neighboring V2X communication devices and an extended mode value of the V2X communication device;
    determining whether to adjust the extended mode value of the V2X communication device based on whether the mode difference value is within a first threshold range; and
    adjusting the extended mode value of the V2X communication device if the mode difference value is out of a preset threshold range.

11. The V2X communication device of claim 10, wherein
    adjusting the extended mode value of the V2X communication device is performed to decrease the difference between the extended mode value of the V2X communication device and the average of the extended mode values of the neighboring V2X communication devices.

12. The V2X communication device of claim 8, wherein
    determining the multi-channel access interval based on the extended mode value is performed by:
    measuring a channel busy ratio (CBR) of the first service channel;
    determining whether to adjust the extended mode value of the V2X communication device based on whether the CBR value of the first service channel is within a second threshold range; and
    adjusting the extended mode value of the V2X communication device if the CBR value of the first service channel is out of the second threshold range.

13. The V2X communication device of claim 12, wherein adjusting the extended mode value of the V2X communication device is performed to increase the extended mode value if the CBR value of the first service channel exceeds a maximum value of the second threshold range and to decrease the extended mode value if the CBR value of the first service channel is less than a minimum value of the second threshold range.

14. The V2X communication device of claim 8, wherein the first service channel is used for safety-related information communication, and the second service channel is used for non-safety information communication.

\* \* \* \* \*